United States Patent
Cai et al.

(10) Patent No.: US 10,165,127 B2
(45) Date of Patent: Dec. 25, 2018

(54) CHARGING FOR USAGE OF RADIO RESOURCES THAT ARE SHARED BETWEEN MTC TRAFFIC AND NON-MTC TRAFFIC

(71) Applicant: Alcatel-Lucent USA Inc., Murray Hill, NJ (US)

(72) Inventors: Yigang Cai, Naperville, IL (US); Ranjan Sharma, New Albany, OH (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 15/390,317

(22) Filed: Dec. 23, 2016

(65) Prior Publication Data

US 2018/0183938 A1      Jun. 28, 2018

(51) Int. Cl.
| | |
|---|---|
| *H04M 11/00* | (2006.01) |
| *H04M 15/00* | (2006.01) |
| *H04W 4/24* | (2018.01) |
| *H04W 72/04* | (2009.01) |
| *H04L 5/00* | (2006.01) |
| *H04L 12/14* | (2006.01) |
| *H04W 4/70* | (2018.01) |

(52) U.S. Cl.
CPC ............ *H04M 15/61* (2013.01); *H04W 4/24* (2013.01); *H04W 72/042* (2013.01); *H04L 5/0053* (2013.01); *H04L 12/1403* (2013.01); *H04L 12/1407* (2013.01); *H04M 15/64* (2013.01); *H04M 15/65* (2013.01); *H04M 15/66* (2013.01); *H04W 4/70* (2018.02)

(58) Field of Classification Search
CPC ..... H04W 4/24; H04W 72/04; H04W 72/085; H04W 76/02; H04W 16/10; H04W 16/14; H04W 28/16; H04W 28/18; H04W 28/24; H04W 28/04; H04W 24/00
USPC .................... 455/450, 452.1, 405, 406, 408
See application file for complete search history.

(56) References Cited

U.S. PATENT DOCUMENTS

| | | | |
|---|---|---|---|
| 2010/0254319 A1* | 10/2010 | Karaoguz et al. | .... H04W 72/04 370/329 |
| 2015/0326738 A1 | 11/2015 | Li et al. | |

(Continued)

OTHER PUBLICATIONS

MediaTek Inc. 3GPP TSG-RAN WG1 Meeting #80BIS; R1-152115; Discussion on PUCCH transmission for Rel-13 MTC; Apr. 2015.

*Primary Examiner* — Temica M Beamer
(74) *Attorney, Agent, or Firm* — Duft & Bornsen, PC

(57) ABSTRACT

Systems and methods for charging in networks where radio resources are shared between Machine Type Communication (MTC) traffic and legacy traffic. A base station of a wireless access network determines a scheduling of radio resources on the air interface between MTC traffic and legacy traffic, and provides signaling to an MTC device and a legacy device indicating the scheduling of the radio resources. The base station collects resource sharing information regarding the sharing of the radio resources between the MTC traffic and the legacy traffic, and transmits a message to a network element of a core network that includes the resource sharing information. The network element may then forward the resource sharing information to a charging system so that the sharing of the radio resources is taken into account when charging the MTC device and/or the legacy device for usage of the air interface.

27 Claims, 5 Drawing Sheets

(56) References Cited

U.S. PATENT DOCUMENTS

| | | | |
|---|---|---|---|
| 2016/0006883 A1* | 1/2016 | Cartmell | H04M 15/00 |
| | | | 15/66 |
| 2016/0226639 A1 | 8/2016 | Xiong et al. | |
| 2016/0338022 A1* | 11/2016 | Choi et al. | H04W 72/04 |
| | | | 72/42 |
| 2017/0164400 A1* | 6/2017 | Fong et al. | H04W 72/12 |
| 2017/0164404 A1* | 6/2017 | Sundararajan et al. | ................. |
| | | | H04W 74/04 |
| | | | 74/4 |
| 2017/0290046 A1* | 10/2017 | Sun et al. | H04W 72/12 |
| 2017/0303189 A1* | 10/2017 | Hampel et al. | H04W 48/20 |
| | | | 48/20 |

* cited by examiner

CHARGING FOR USAGE OF RADIO RESOURCES THAT ARE SHARED BETWEEN MTC TRAFFIC AND NON-MTC TRAFFIC

FIELD OF THE INVENTION

The invention is related to the field of communication systems and, in particular, to sharing of radio resources between Machine Type Communications (MTC) and non-MTC.

BACKGROUND

Machine Type Communications (MTC) or Machine-to-Machine (M2M) communications refer to technologies that allow devices to communicate with no or little human intervention. MTC devices store data, and transmit the data to other MTC devices or an MTC server over a network, such as a cellular network. For example, an MTC device may be attached to a gas or electric meter, and the MTC device periodically (e.g., weekly, monthly, etc.) transmits a meter reading to an MTC server, such as at the utility company.

The amount of data exchanged between MTC devices is typically very small, such as less than a few bytes. Because MTC devices send or receive only small amounts of data, the exchanges of data are considered "small data transmissions". The amount that is considered "small" may depend on individual network operators.

MTC continue to increase over core networks. Thus, efficient use of network resources, especially radio resources, to provide MTC is important to network operators.

SUMMARY

Embodiments described herein provide a charging mechanism that charges for data transmissions when radio resources are shared between MTC traffic and non-MTC traffic. A base station of an access network, for instance, is able to determine a scheduling so that MTC devices can share the radio resources with non-MTC devices. In the embodiments described below, the base station is also able to collect information on the resource sharing, and report this information to the core network. An element in the core network may then report the resource sharing information to a charging system so that the charging system can account for the resource sharing in charging for usage of the air interface by the MTC devices and non-MTC devices. When radio resources are shared in this manner, mobile devices that share radio resources may be given a discount by the service provider instead of being charged at a full rate. This is advantageous in that MTC devices, which utilize small data transmissions, are able to share resources with non-MTC devices so that service providers do not have to dedicate channels to the MTC devices. At the same time, the non-MTC devices may receive a discount if the resources are shared with MTC devices during data transmissions.

One embodiment comprises a base station of a wireless access network that is configured to communicate with a plurality of mobile devices over an air interface. The base station includes a scheduler configured to determine a scheduling of radio resources on the air interface between MTC traffic and legacy traffic, and to provide signaling to an MTC device and a legacy device indicating the scheduling of the radio resources. The base station also includes a resource sharing detector configured to collect resource sharing information regarding the sharing of the radio resources between the MTC traffic and the legacy traffic, and to transmit a message to a network element of a core network that includes the resource sharing information.

In another embodiment, the resource sharing information includes a sharing indicator specifying that the radio resources are subject to sharing between the MTC traffic and the legacy traffic.

In another embodiment, the resource sharing information includes a method type employed in sharing the radio resources, wherein the method type is selected from static, semi-static, dynamic, or semi-dynamic.

In another embodiment, the resource sharing information includes a time period indicator of when the sharing of the radio resources was in effect.

In another embodiment, the resource sharing information includes an apportionment of the radio resources used for the MTC traffic and the legacy traffic on the air interface.

In another embodiment, the base station comprises an eNodeB of an Evolved-UMTS Terrestrial Radio Access Network (E-UTRAN).

Another embodiment comprises a method operable in a base station of a wireless access network that communicates with a plurality of mobile devices over an air interface. The method includes determining a scheduling of radio resources on the air interface between MTC traffic and legacy traffic, providing signaling from the base station to an MTC device and a legacy device indicating the scheduling of the radio resources, collecting resource sharing information regarding the sharing of the radio resources between the MTC traffic and the legacy traffic, and transmitting a message from the base station to a network element of a core network that includes the resource sharing information.

Another embodiment comprises a network element of a core network that provides services to mobile devices that attach to a wireless access network. The network element includes a network interface component configured to receive resource sharing information regarding sharing of radio resources between MTC traffic and legacy traffic over an air interface. The network element further includes a controller that implements a Charging Trigger Function (CTF) configured to collect charging information for a mobile device regarding either the MTC traffic or the legacy traffic, to format the charging information into a charging request, to format the resource sharing information regarding the sharing of the radio resources between the MTC traffic and the legacy traffic into the charging request, and to transmit the charging request to a charging system.

In another embodiment, the charging request comprises a Diameter charging request, and at least one new Attribute Value Pair (AVP) is defined for the Diameter charging request specifically for the resource sharing information.

In another embodiment, the at least one AVP includes an AVP defined for a sharing indicator specifying that the radio resources are subject to sharing between the MTC traffic and the legacy traffic.

In another embodiment, the at least one AVP includes an AVP defined for a method type employed in sharing the radio resources, where the method type is selected from static, semi-static, dynamic, or semi-dynamic.

In another embodiment, the at least one AVP includes an AVP defined for a time period indicator of when the sharing of the radio resources was in effect.

In another embodiment, the at least one AVP includes an AVP defined for an apportionment of the radio resources used for the MTC traffic and the legacy traffic on the air interface.

In another embodiment, the charging system comprises an Offline Charging System (OFCS). The OFCS is configured to receive the charging request, to process the resource sharing information included in the charging request, and to generate a partial Charging Data Record (CDR) that includes a charging field for the resource sharing information.

In another embodiment, the charging system comprises an Online Charging System (OCS). The OCS is configured to receive the charging request, to process the resource sharing information included in the charging request, and to grant a credit slice for the mobile device with a charging rate discounted based on the resource sharing information.

Another embodiment comprises a method of charging for usage of radio resources that are shared between MTC traffic and legacy traffic over an air interface. The method includes receiving (in a network element of a core network) resource sharing information regarding sharing of the radio resources between the MTC traffic and the legacy traffic over an air interface, collecting charging information at a Charging Trigger Function (CTF) of the network element for a mobile device regarding either the MTC traffic or the legacy traffic, formatting the charging information into a charging request, formatting the resource sharing information regarding the sharing of the radio resources between the MTC traffic and the legacy traffic into the charging request, and transmitting the charging request from the CTF to a charging system.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
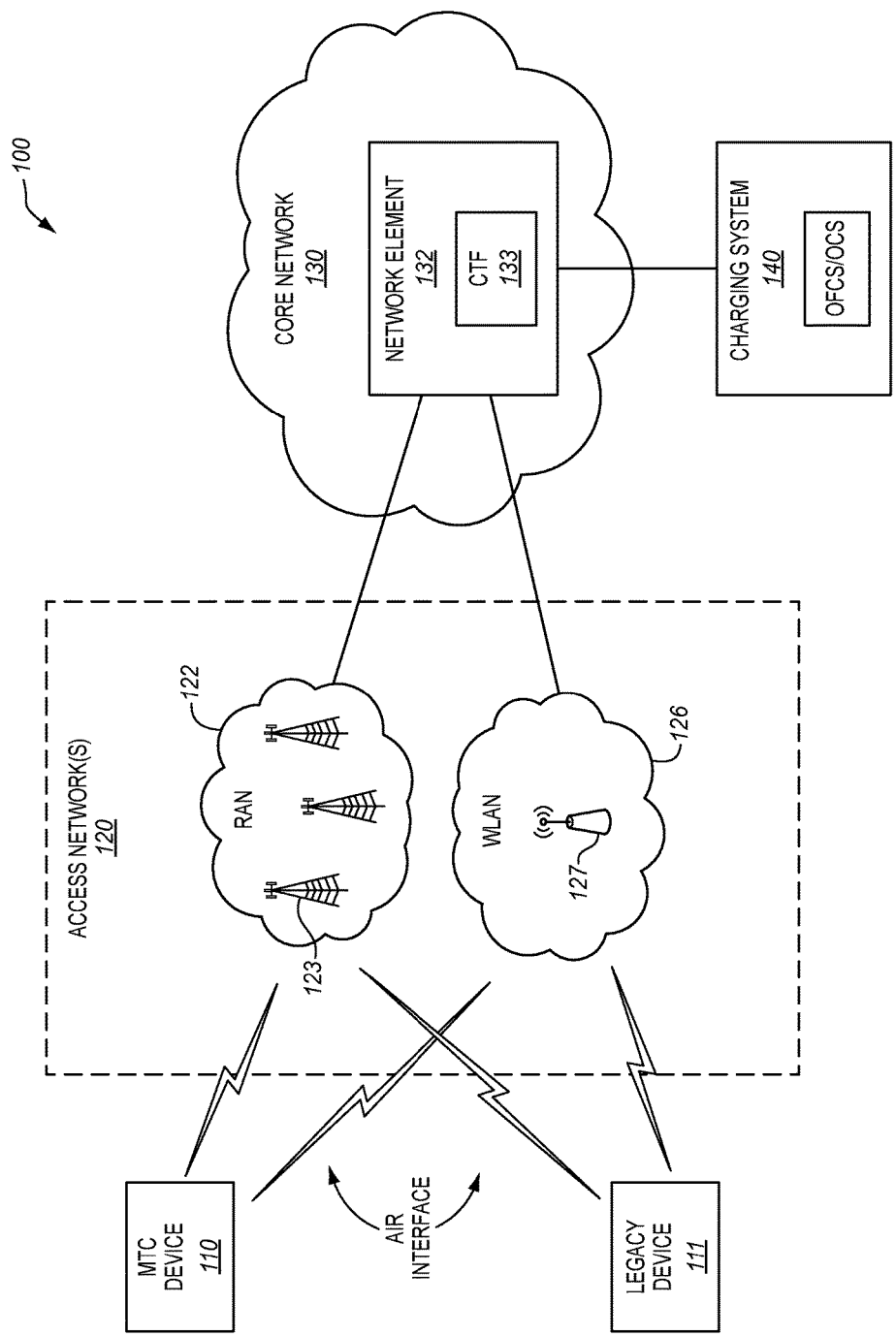
FIG. 1 illustrates a communication network in an exemplary embodiment.

FIG. 1 illustrates a communication network 100 in an exemplary embodiment. Communication network 100 is a cellular network or mobile network where the last link is wireless, and provides voice and/or data services to a plurality of mobile devices (also referred to as wireless devices or User Equipment (UE)). Communication network 100 is a Third Generation (3G), Fourth Generation (4G), or later generation network, such as a Long Term Evolution (LTE) network.

Communication network 100 may provide an Internet of Things (IoT) solution, which refers to interconnection and the autonomous exchange of data between devices that are machines or parts of machines. IoT uses Machine-to-Machine (M2M) communications or Machine-Type Communications (MTC). M2M/MTC is defined as data communication between devices without the human interaction. Examples of M2M/MTC services include utility meters, vending machines, fleet management, smart traffic, real-time traffic information to a vehicle, security monitoring, medical metering and alerting, etc. M2M/MTC services work well with lower data rates than regular cellular services. For example, the Third Generation Partnership Project (3GPP) has defined new categories for LTE in Release 13, which include LTE Cat-M1 (eMTC) and Cat-NB1 (NB-IoT). Cat-M1 (also referred to as LTE Cat 1.4 MHz) has a peak rate of 1 Mbps for uplink (UL) and downlink (DL), and a bandwidth of 1.4 MHz. Cat-NB1 (also referred to as LTE Cat 200 kHz) has a peak rate of 200 kbps for DL, peak rate of 144 Mbps for UL, and a bandwidth of 200 kHz. MTC-enabled devices may operate according to one of these categories for MTC within communication network 100.

Communication network 100 also provides regular high-speed wireless communications for mobile devices and data terminals. For example, the LTE standard set forth by the 3GPP defines Cat-4. Cat-4 (in Release 8) has a peak rate of 150 Mbps for DL, a peak rate of 50 Mbps for UL, and a bandwidth of 20 MHz. These "regular" communications in communication network 100 are referred to herein as "legacy" communications. Legacy communications are defined as non-MTC, such as voice calls, streaming video, streaming audio, or other higher-speed communications. Non-MTC-enabled devices may perform legacy communications (e.g., Cat-4) for non-MTC within communication network 100.

Communication network 100 is illustrated as providing communication services to devices 110-111 (along with other devices not shown). Device 110 is enabled for M2M/MTC services, and is referred to as MTC device 110. MTC device 110 is configured to send and receive various types of data transmissions, which may be referred to herein as MTC traffic. For example, MTC traffic may include small data transmissions, such as sensor readings, temperature readings, control signals, etc. Device 111 is enabled for regular voice and/or data services, and is referred to as legacy device 111. Legacy device 111 may include any wireless device not classified as an MTC-enabled device. For example, legacy device 111 may include end user devices such as laptop computers, tablets, smartphones, etc. Legacy device 111 is configured to send and receive various types of data transmissions, which may be referred to herein as legacy traffic. For example, legacy traffic which may include voice calls, audio, video, multimedia, data, etc.

Communication network 100 includes one or more wireless access networks 120 that communicate with devices 110-111 over radio signals. One of the access networks 120 may be a Radio Access Network (RAN) 122 that includes one or more base stations 123. Base station 123 comprises an entity that uses radio communication technology to communicate with a device on the licensed spectrum, and interface the device with a core network. One example of RAN 122 is an Evolved-UMTS Terrestrial Radio Access Network (E-UTRAN) having one or more Evolved-NodeBs (eNodeB), which are base stations of the E-UTRAN.

Another one of the access networks 120 may be a Wireless Local Area Network (WLAN) 126 that includes one or more Wireless Access Points (WAP) 127. WLAN 126 is a network in which a mobile user is able to connect to a Local Area Network (LAN) through a wireless (radio) connection. WAP 127 is a device that uses radio communication technology to communicate with a device over the unlicensed spectrum, and provides the device access to a core network. One example of WAP 127 is a WiFi access point that operates on the 2.4 GHz or 5 GHz radio bands.

Devices 110-111 are able to attach to RAN 122 and/or WLAN 126 to access a core network 130. In other words, access networks 120 represent the air interface between devices 110-111 and core network 130. Core network 130 is the central part of communication network 100 that provides various services to customers who are connected by one (or more) of access networks 120. One example of core network 130 is the Evolved Packet Core (EPC) network as suggested by the 3GPP for LTE. Core network 130 includes one or more network elements 132, which comprises a server, device, apparatus, or equipment (including hardware) that provides services for devices 110-111. Network element 132, particularly in an EPC network, may comprise a Mobility Management Entity (MME), a Serving Gateway (S-GW), a Packet Data Network Gateway (P-GW), etc. Within an EPC network, the user data (also referred to as the "user plane") and the signaling (also referred to as the "control plane") are separated. The MME handles the control plane within the EPC network. For instance, the MME handles the signaling related to mobility and security for E-UTRAN access. The MME is responsible for tracking and paging mobile devices in idle-mode. The S-GW and P-GW handle the user plane. The S-GW and P-GW transport IP data traffic between devices 110-111 and the external IP networks. The S-GW is the point of interconnect between the radio-side and the EPC network, and serves a device 110-111 by routing incoming and outgoing IP packets. The S-GW is also the anchor point for the intra-LTE mobility (i.e., in case of handover between eNodeBs), and between LTE and other 3GPP accesses. The P-GW is the point of interconnect between the EPC network and external IP networks, and routes packets to and from the external IP networks.

Network element 132 implements a Charging Trigger Function (CTF) 133 to report charging events for MTC services and/or legacy services. A CTF is a component that detects chargeable events for services, assembles information for the chargeable events into matching charging events, and sends the charging events to a charging system. CTF 133 is configured to trigger on events related to a service, to collect information regarding the service, and report the information to the charging system.

Communication network 100 also includes a charging system 140. Charging system 140 comprises a server, device, apparatus, or equipment (including hardware) that allows a service provider to charge for service usage within communication network 100. Charging system 140 may comprise an Offline Charging System (OFCS) in one embodiment. An OFCS comprises a server, device, apparatus, or equipment (including hardware) that provides offline charging for services provided in communication network 100. Offline charging is a process where charging information for resource usage is collected concurrently with resource usage. Offline charging can be of two types: session-based or event-based. In event-based charging, a CTF (e.g., CTF 133) reports the usage or the service rendered where the service offering is rendered in a single operation. For example, the CTF may report the usage in a Diameter Rf Accounting Request (ACR) EVENT. Session-based charging is the process of reporting usage for a service, and uses the START, INTERIM, and STOP accounting data. During a service, a CTF may transmit multiple ACR Interims depending on the proceeding of the session. If offline charging applies, the interface or reference point between CTF 133 and charging system 140 may be Diameter Rf.

Charging system 140 may alternatively comprise an Online Charging System (OCS) in another embodiment. An OCS comprises a server, device, apparatus, or equipment (including hardware) that provides online charging for services provided in communication network 100. Online charging is a charging mechanism where charging information can affect, in real-time, the service rendered and therefore a direct interaction of the charging mechanism with session/service control is required. Online charging can also be session-based or event-based. If online charging applies, the interface or reference point between CTF 133 and charging system 140 may be Diameter Ro. A further discussion of charging principles is described in 3GPP TS 32.240, which is incorporated by reference as if fully included herein.

IoT services as provided by communication network 100 are projected to be a driver for further growth in cellular, as billions of these devices will be deployed in the future. Thus, many MTC devices will be competing for radio resources of the air interface. For LTE-based services, the basic premise is that MTC devices will use specific radio resources of the air interface per 3GPP standards. However, allocation of an entire radio channel for each MTC device (or even a logical group of devices) can be expensive. Radio channel demands for MTC services are very low and tend to be sporadic due to the goal of conserving battery power on MTC devices. Thus, a dedicated radio bearer, even of a low capacity (e.g., 200 Mbps), would remain expensive for a service provider.

Because the usage profile of MTC devices is sporadic and involves small data transmissions, the UL and DL channels for MTC traffic will likely be shared with regular, legacy traffic (e.g., LTE data traffic and VoLTE traffic). Thus, an access network 120 can perform radio resource allocation in a number of ways to share the radio resources of the air interface between MTC traffic and legacy traffic.

Figure 2:
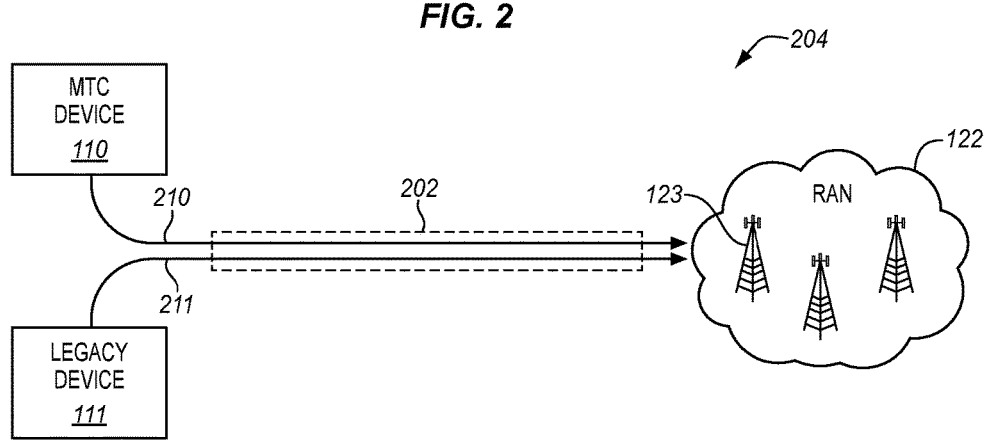
FIG. 2 illustrates radio resource sharing in an exemplary embodiment.

FIG. 2 illustrates radio resource sharing in an exemplary embodiment. FIG. 2 illustrates a UL data transmission from MTC device 110 and legacy device 111 to base station 123. In this embodiment, base station 123 has established a radio bearer or radio channel 202, which is a physical connection of the air interface 204 that is radio-based. Base station 123 also determines a scheduling of radio resources on radio channel 202 so that the radio resources are shared between MTC device 110 and legacy device 111. Based on the scheduling, MTC device 110 sends a data transmission 210 over radio channel 202 concurrently with legacy device 111 sending a data transmission 211 over radio channel 202. The data transmissions 210-211 share the radio resources of radio channel 202, such as a frame, a subframe, etc., in the time domain, and physical resource blocks (PRBs) and narrow bands (NBs) in frequency domain, for an LTE air interface.

Figure 3:
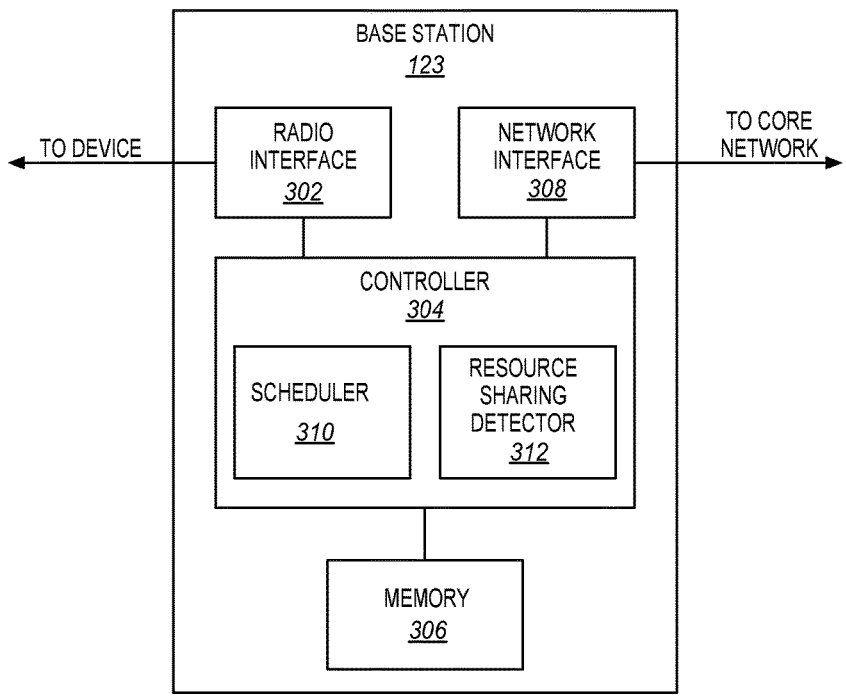
FIG. 3 is a block diagram of a base station in an exemplary embodiment.

FIG. 3 is a block diagram of base station 123 in an exemplary embodiment. Base station 123 includes a radio interface component 302, a controller 304 (including a processor), a memory 306, and a network interface component 308. Radio interface component 302 represents the local radio resources of base station 123, such as transceivers and antennas, used for wireless communications to exchange over-the-air signals. Controller 304 represents the internal circuitry, logic, hardware (e.g., a processor), software, etc., that provides the functions of base station 123. Memory 306 is a storage unit for data, instructions, applications, etc., and is accessible by controller 304. Network interface component 308 is an interface component that provides an interface or backhaul connection with core network 130. The elements of base station 123 may be implemented on the same hardware platform (including one or more processors), or on separate platforms. The block diagram illustrated in FIG. 3 may also be used to illustrate the structure of WAP 127 in WLAN 126.

Base station 123 is configured to schedule the transmission of MTC traffic of MTC device 110 and legacy traffic of legacy device 111 via the radio resources of the air interface 204. The scheduling of the transmission of MTC traffic and legacy traffic via the radio resources may include sharing of the radio resources between the MTC traffic and legacy traffic. Controller 304 of base station 123 implements a scheduler 310 that is configured to schedule the transmission of MTC traffic and legacy traffic via the radio resources. Controller 304 of base station 123 also implements a resource sharing detector 312 that is configured to determine how or if radio resources of an (wireless) access network are shared between MTC traffic and legacy traffic. Radio resource sharing will significantly save resources on the air interface 204, and increase system capacity. However, sharing of radio resources between MTC traffic and legacy traffic should be reflected in the charges accrued for radio resource usage. The embodiments described below set forth a new charging solution when radio resources are shared between MTC traffic and legacy traffic.

Figure 4:
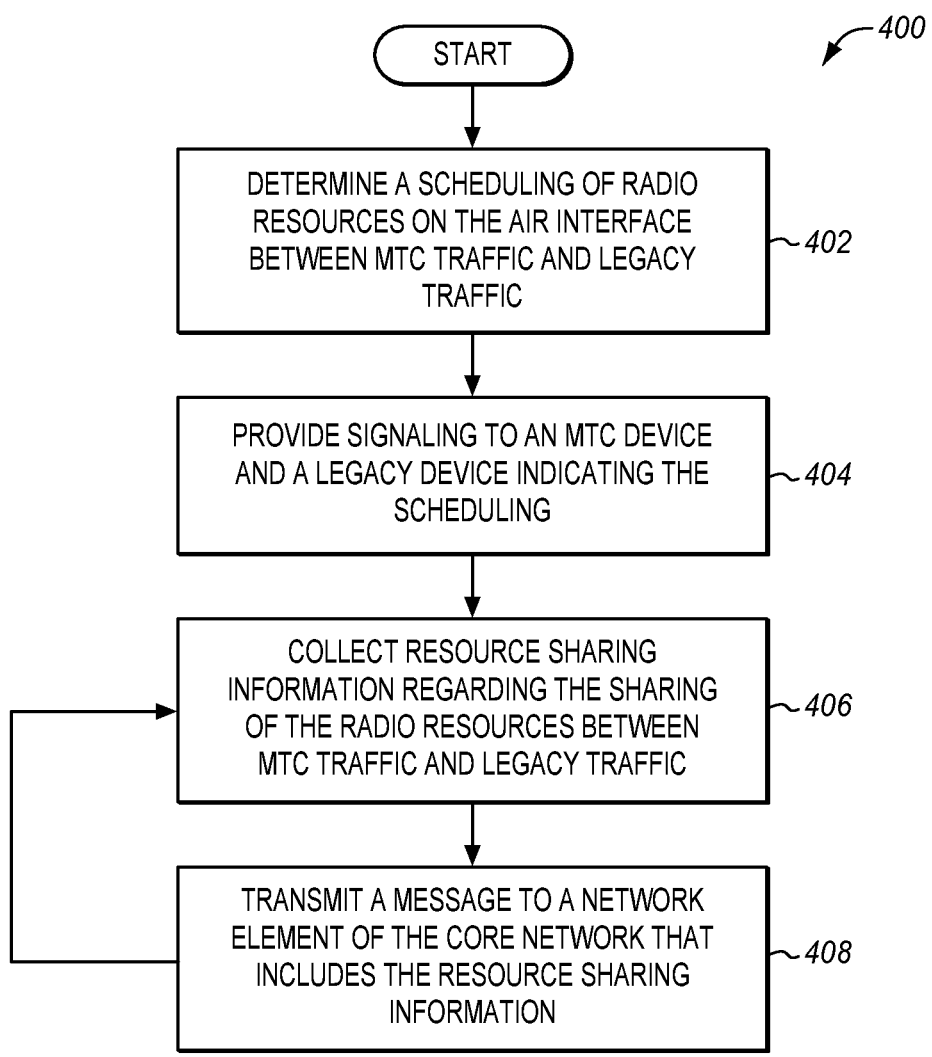
FIG. 4 is a flow chart illustrating a method of operating a base station in an exemplary embodiment.

FIG. 4 is a flow chart illustrating a method 400 of operating base station 123 in an exemplary embodiment. The steps of method 400 will be described with reference to communication network 100 and base station 123 in FIGS. 1-3, but those skilled in the art will appreciate that method 400 may be performed in other networks or architectures. Also, the steps of the flow charts described herein are not all inclusive and may include other steps not shown, and the steps may be performed in an alternative order.

In step 402, scheduler 310 determines a scheduling of radio resources on the air interface 204 between MTC traffic (e.g., involving data transmissions of MTC device 110) and legacy traffic (e.g., involving data transmissions of legacy device 111). As described above, MTC device 110 and legacy device 111 communicate with access network 120 using a set of radio resources on the air interface 204. The set of radio resources on the air interface 204 may be used to provide a DL radio channel configured to support data transmissions to MTC device 110 and legacy device 111. The set of radio resources on the air interface 204 may also be used to provide a UL radio channel configured to support data transmissions from MTC device 110 and legacy device 111. The scheduling of data transmissions using the set of radio resources may be configured in various ways, which may depend on the wireless system type (e.g., LTE, 5G, etc.) or other factors. For example, within a 4G LTE network, the set of radio resources may be defined as follows: one frame is 10 ms and contains 10 sub-frames, one sub-frame is 1 ms and contains 2 time slots, one time slot is 0.5 ms and contains a set of 10 resource elements which make up a Physical Resource Block (PRB), and a PRB of a time slot contains 12 subcarriers for each Orthogonal Frequency-Division Multiplexing (OFDM) symbol in the frequency domain where there may be 7 symbols per time slot in the time domain (normal cyclic prefix) for a total of 84 carrier symbols. The PRB is the smallest assignable unit of physical wireless resources. In general, scheduler 310 is configured to allocate PRBs within an interval of time referred to as the Transmission Time Interval (TTI), which is the smallest unit of time within which scheduler 310 may schedule transmissions using PRBs. The set of radio resources may be configured in other ways in other types of networks. However, the set of radio resources is expected to support the smallest assignable unit of radio resources (which may be referred to herein as a PRB), and a smallest unit of time within which scheduler 310 may schedule transmissions using PRBs.

The sharing of radio resources between the MTC traffic and legacy traffic may include time domain resource sharing, frequency domain resource sharing, or a combination. For example, within an LTE network, the sharing of radio resources between the MTC traffic and legacy traffic may include sharing one or more subframes, one or more subcarriers, etc., for a target scheduling interval. For example, within an LTE network, the sharing of radio resources may include assigning the MTC traffic and legacy traffic to various PRBs in ways that enable sharing of time and/or frequency resources of the TTI. Scheduler 310 may determine radio resource sharing for the MTC traffic and legacy traffic based on various types of information. The scheduling as described herein may include assigning portions of the radio resources during the target scheduling interval for use by specific devices (e.g., scheduling use of portions of the radio resources of the target scheduling interval that are allocated for MTC traffic by one or more MTC devices, and scheduling use of portions of the radio resources of the target scheduling interval that are allocated for legacy traffic by one or more legacy devices).

In step 404, scheduler 310 provides signaling over the control plane to MTC device 110 and legacy device 111 indicating the scheduling, such as in a resource sharing bitmap. The scheduling of traffic on the radio resources informs each device 110-111 of respective portions of the radio resources assigned to those devices 110-111. For example, the scheduling may include scheduling traffic on the DL using DL radio resources and scheduling traffic on the UL using UL radio resources. Based on the scheduling, MTC device 110 and legacy device 111 may share radio resources on a DL channel and/or UL channel of the air interface 204 to transmit or receive data transmissions.

In step 406, resource sharing detector 312 collects resource sharing information regarding the sharing of the radio resources between MTC traffic and legacy traffic over the air interface 204. Base station 123 serves as a conduit for data transmissions sent or received by mobile devices. Resource sharing detector 312 is able to process the data transmissions (e.g., data packets) to determine if radio resources are shared over the air interface 204 between MTC and legacy traffic. Resource sharing detector 312 may also detect which devices or group of devices are involved in the data transmissions, and detect device identifiers (IDs) for the devices or group of devices that are involved in the data transmissions. The resource sharing information may include a sharing indicator specifying that radio resources are subject to sharing between MTC traffic and legacy traffic over the air interface 204. The resource sharing information may include a method type employed in sharing the radio resource (e.g., static, semi-static, dynamic, or semi-dynamic). Static sharing is a management scheme that divides resources in frequency and time dimensions without considering MTC and legacy traffic load changes. Dynamic sharing is a management scheme that dynamically changes shared resources in both frequency and time dimensions according to MTC and legacy traffic load changes. Semi-static sharing is a management scheme that moves resources to either one of device types (i.e., MTC or legacy) depending on MTC and legacy traffic load. Semi-dynamic sharing is a management scheme similar to dynamic, but only a portion of resources are changed due to MTC and legacy traffic load changes. The resource sharing information may include a time period (i.e., sharing interval) indicator of when sharing of the radio resources was in effect. The resource sharing information may include an apportionment (i.e., a percentage) of radio resources used for the MTC traffic and the legacy traffic over the air interface 204. The apportionment may be a percentage of radio resources scheduled for MTC traffic versus legacy traffic over the air interface 204. The apportionment may be a percentage of radio resources scheduled for MTC device versus legacy devices. The resource sharing information may be characterized per device ID for the mobile devices that share the radio resources.

In step 408, resource sharing detector 312 transmits a message to network element 132 that includes the resource sharing information. For example, if network element 132 comprises a P-GW of an EPC network (including a Policy and Charging Enforcement Function (PCEF)), then resource sharing detector 312 may send the resource sharing information to the MME over the S1 Application Protocol (S1AP) interface. The MME may then forward the resource sharing information to the P-GW over the S11 interface.

Figure 5:
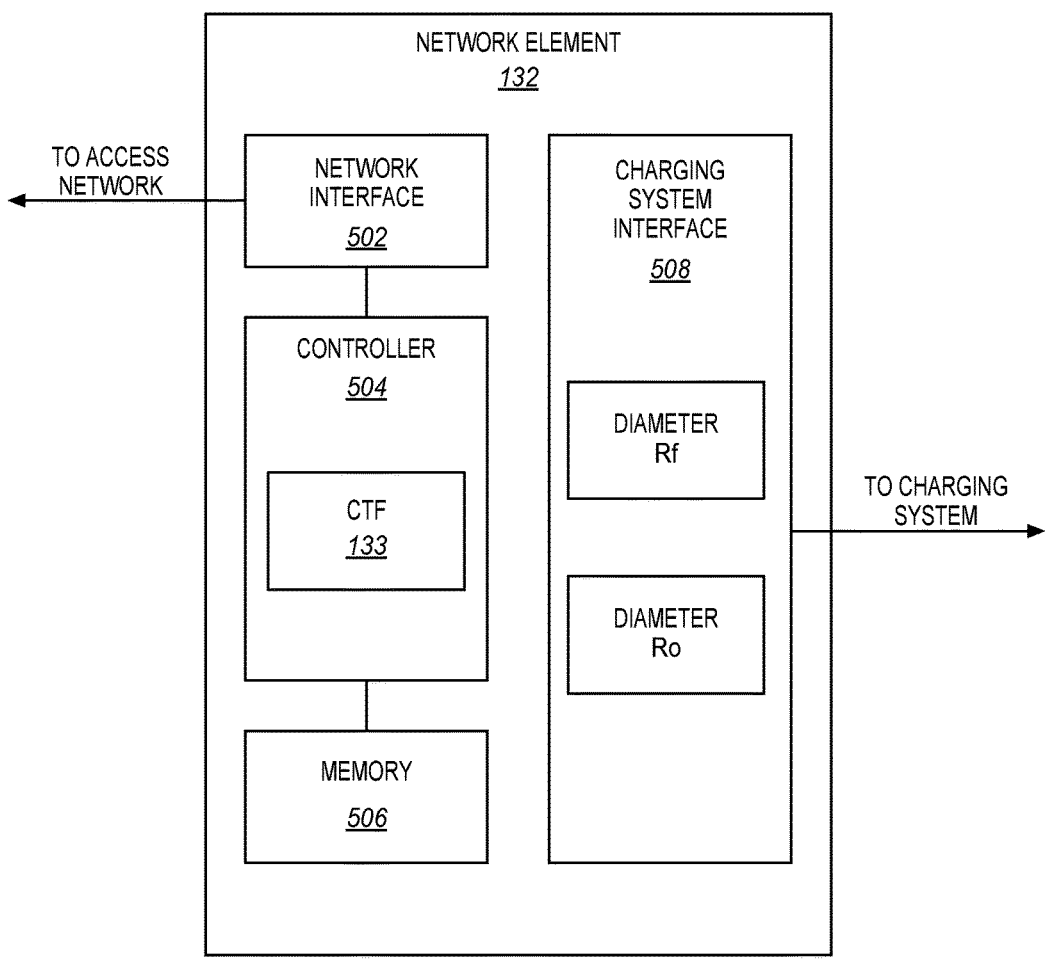
FIG. 5 is a block diagram of a network element in an exemplary embodiment.

FIG. 5 is a block diagram of network element 132 in an exemplary embodiment. Network element 132 includes a network interface component 502, a controller 504 (including a processor), a memory 506, and a charging system interface component 508. Network interface component 502 is a component that provides an interface or backhaul connection with base station 123, WAP 127, or another element of an access network 120. Controller 504 represents the internal circuitry, logic, hardware (e.g., a processor), software, etc., that provides the functions of network element 132. Controller 504 implements the CTF 133 of network element 132. Memory 506 is a storage unit for data, instructions, applications, etc., and is accessible by controller 504. Charging system interface component 508 is a component that provides an interface or direct connection with charging system 140. Charging system interface component 508 may comprise a Diameter Rf component if charging system 140 comprises an OFCS. Charging system interface component 508 may comprise a Diameter Ro component if charging system 140 comprises an OCS. The elements of network element 132 may be implemented on the same hardware platform (including one or more processors), or on separate platforms.

Figure 6:
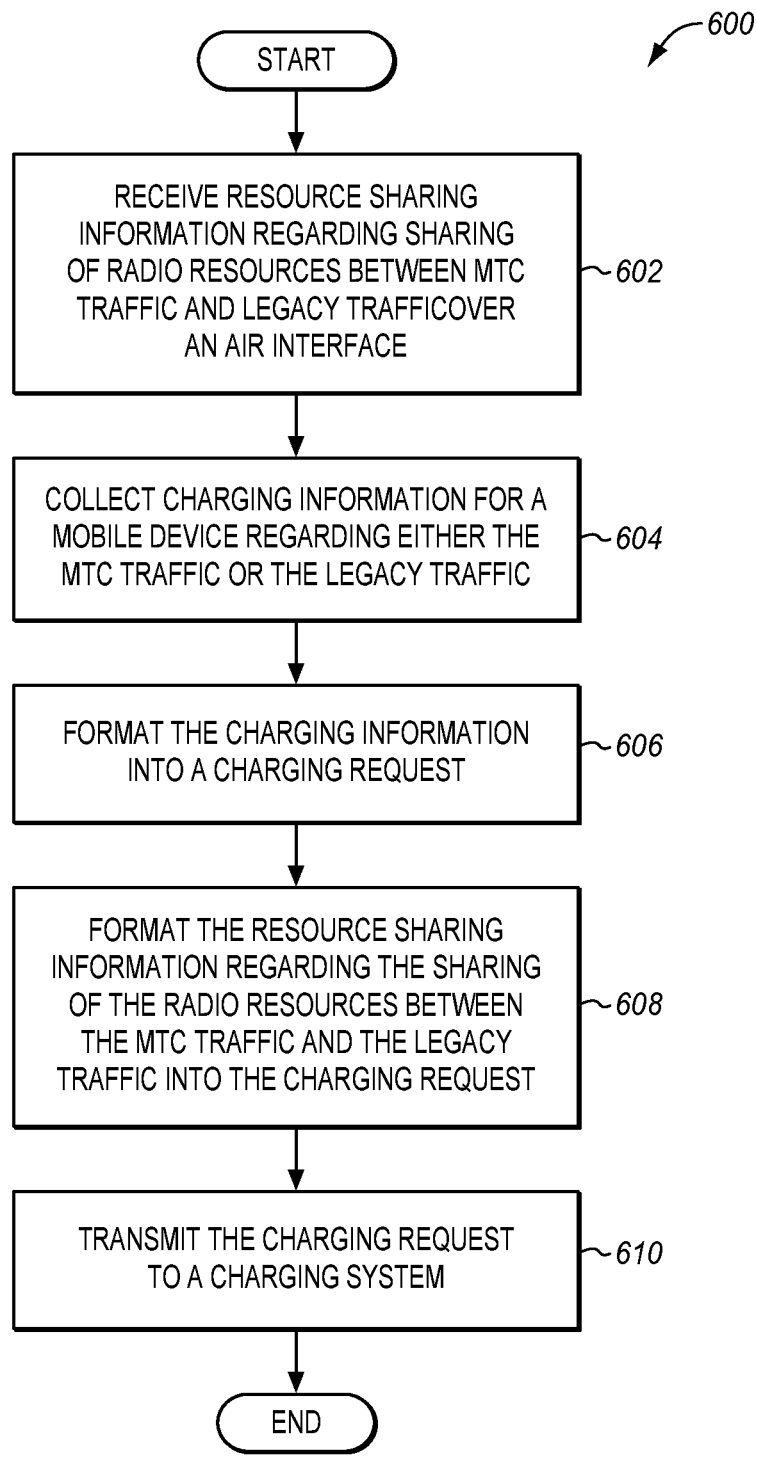
FIG. 6 is a flow chart illustrating a method of operating a network element in an exemplary embodiment.

FIG. 6 is a flow chart illustrating a method 600 of operating network element 132 in an exemplary embodiment. The steps of method 600 will be described with reference to communication network 100 and network element 132 in FIGS. 1 and 5, but those skilled in the art will appreciate that method 600 may be performed in other networks or architectures.

In step 602, network interface component 502 of network element 132 receives the resource sharing information regarding the sharing of the radio resources between MTC traffic and legacy traffic. As described above, the resource sharing information may be characterized per device ID for the mobile devices that share the radio resources. CTF 133 in network element 132 is programmed to trigger on certain chargeable events related to services provided by network element 132. Responsive to a triggering event, controller 504 (through CTF 133) collects charging information for a mobile device regarding either the MTC traffic or the legacy traffic (step 604). The charging information comprises any information that a charging system 140 may use to perform accounting or credit control for a service. For example, if CTF 133 triggers on a chargeable event for MTC device 110, then CTF 133 will collect charging information for the MTC traffic involving MTC device 110. If CTF 133 triggers on a chargeable event for legacy device 111, then CTF 133 will collect charging information for the legacy traffic involving legacy device 111. After collecting the charging information, controller 504 formats the charging information into a charging request (step 606). One example of a charging request is a Diameter Rf Accounting Request (ACR). Another example of a charging request is a Diameter Ro Credit Control Request (CCR). Controller 504 may therefore format the charging information related to the service into Attribute Value Pairs (AVP) of the charging request.

Controller 504 also formats the resource sharing information regarding the sharing of the radio resources between MTC traffic and legacy traffic into the charging request (step 608). Because the radio resources were shared between MTC traffic and legacy traffic, charging for usage of the radio resources should be adjusted to reflect the resource sharing. Thus, controller 504 inserts the resource sharing information into the charging request so that the usage of the radio resources by a particular mobile device takes into account the sharing of the radio resources.

In order to support the the resource sharing information, enhancements to Diameter protocol are suggested herein to add new AVPs. For the additional AVPs required specifically for radio resource sharing, a new AVP called "Radio-Resource-Sharing-Info" is proposed. The Radio-Resource-Sharing-Info AVP is of type "Grouped", and contains the resource sharing information provided by base station 123. The following ABNF grammar for this grouped AVP is proposed:

```
Radio-Resource-Sharing-Info ::= < AVP Header: TBD >
                                [Radio-Resource-Sharing-Indicator]
                                [Resource-Sharing-Method-Type]
                                [Resource-Sharing-Period]
                                [Resource-Sharing-Usage]
```

The "Radio-Resource-Sharing-Indicator" AVP is defined for a sharing indicator specifying that the radio resources are subject to sharing between MTC traffic and legacy traffic. The "Resource-Sharing-Method-Type" AVP is defined for a method type employed in sharing the radio resources, such as static, semi-static, dynamic, or semi-dynamic. The "Resource-Sharing-Period" AVP is defined for a time period indicator of when the sharing of the radio resources was in effect. The "Resource-Sharing-Usage" AVP is defined for an apportionment of the radio resources used for MTC traffic and legacy traffic. Controller 504 (through CTF 133) populates these AVPs of the charging request with the resource sharing information. Charging system interface component 508 then transmits the charging request to charging system 140 (step 610).

If charging system 140 comprises an OFCS, then the OFCS receives the charging request, and processes the resource sharing information included in the Radio-Resource-Sharing-Info AVP along with other charging information in other AVPs of the charging request. The OFCS generates a partial Charging Data Record (CDR) with a charging field that corresponds with the Radio-Resource-Sharing-Info AVP (i.e., similar fields to the AVP) for storing the resource sharing information. The charging rate with radio resource sharing should indicate to a billing mediation system to include an apportioned discount based on factors included in the partial CDR that indicate the method type for sharing the radio resources, the time period of sharing, and/or an apportionment (i.e., a percentage) of radio resource usage for a device. The operator may offer discounts depending on device type and other operator agreements.

If charging system 140 comprises an OCS, then the OCS receives the charging request, and processes the resource sharing information included in the Radio-Resource-Sharing-Info AVP along with other charging information in other AVPs of the charging request. The OCS runs its rating engine logic based on the resource sharing information to identify a reduced charging rate for a mobile device, and grants a credit slice to the mobile device based on the reduced charging rate to reflect that the radio resources were shared. For online charging, base station 123 should execute a sharing bitmap after receiving the granted credit slice from the OCS. In other words, when base station 123 makes a resource sharing decision, it will first send an online charging request to network element 132 and network element 132 will query the OCS to get a grant of credit. When network element 132 informs base station 123 of the granted credit, scheduler 310 of base station 123 sends a control message to MTC device 110 and/or legacy device 111 over a control channel to indicate the granted credit and that a data transmission may begin.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof

What is claimed is:

1. A system comprising:
a base station of a wireless access network that is configured to communicate with a plurality of mobile devices over an air interface, the base station comprising:
a scheduler configured to determine a scheduling of radio resources on at least one radio channel of a bandwidth over the air interface that are shared between Machine Type Communication (MTC) traffic and legacy traffic, and to provide signaling to an MTC device and a legacy device indicating the scheduling of the radio resources that are shared on the at least one radio channel; and
a resource sharing detector configured to collect resource sharing information regarding the sharing of the radio resources on the at least one radio channel between the MTC traffic and the legacy traffic, and to transmit a message to a network element of a core network that includes the resource sharing information.

2. The system of claim 1 wherein:
the resource sharing information includes a sharing indicator specifying that the radio resources are subject to sharing between the MTC traffic and the legacy traffic; and
the resource sharing information include device identifiers (IDs) for the MTC device and the legacy device.

3. The system of claim 1 wherein:
the resource sharing information includes a method type employed in sharing the radio resources;
the method type is selected from static, semi-static, dynamic, or semi-dynamic; and
method types of semi-static, dynamic, and semi-dynamic change the sharing of the radio resources based on at least one of MTC traffic load and legacy traffic load.

4. The system of claim 1 wherein:
the resource sharing information includes a time period indicator of when the sharing of the radio resources was in effect.

5. The system of claim 1 wherein:
the resource sharing information includes an apportionment of the radio resources used for the MTC traffic and the legacy traffic on the air interface.

6. The system of claim 1 wherein:
the base station comprises an eNodeB of an Evolved-UMTS Terrestrial Radio Access Network (E-UTRAN).

7. A method operable in a base station of a wireless access network that communicates with a plurality of mobile devices over an air interface, the method comprising:
determining, at the base station, a scheduling of radio resources on at least one radio channel of a bandwidth over the air interface that are shared between Machine Type Communication (MTC) traffic and legacy traffic;
providing signaling from the base station to an MTC device and a legacy device indicating the scheduling of the radio resources that are shared on the at least one radio channel;
collecting, at the base station, resource sharing information regarding the sharing of the radio resources on the at least one radio channel between the MTC traffic and the legacy traffic; and
transmitting a message from the base station to a network element of a core network that includes the resource sharing information.

8. The method of claim 7 wherein:
the resource sharing information includes a sharing indicator specifying that the radio resources are subject to sharing between the MTC traffic and the legacy traffic; and
the resource sharing information include device identifiers (IDs) for the MTC device and the legacy device.

9. The method of claim 7 wherein:
the resource sharing information includes a method type employed in sharing the radio resources;
the method type is selected from static, semi-static, dynamic, or semi-dynamic; and
method types of semi-static, dynamic, and semi-dynamic change the sharing of the radio resources based on at least one of MTC traffic load and legacy traffic load.

10. The method of claim 7 wherein:
the resource sharing information includes a time period indicator of when the sharing of the radio resources was in effect.

11. The method of claim 7 wherein:
the resource sharing information includes an apportionment of the radio resources used for the MTC traffic and the legacy traffic on the air interface.

12. A system comprising:
a network element of a core network that provides services to mobile devices that attach to a wireless access network, the network element comprising:
a network interface component configured to receive resource sharing information regarding sharing of radio resources on at least one radio channel of a bandwidth between Machine Type Communication (MTC) traffic and legacy traffic over an air interface; and
a controller that implements a Charging Trigger Function (CTF) configured to collect charging information for a mobile device regarding either the MTC traffic or the legacy traffic, to format the charging information into a charging request, to format the resource sharing information regarding the sharing of the radio resources on the at least one radio channel between the MTC traffic and the legacy traffic into the charging request, and to transmit the charging request to a charging system.

13. The system of claim 12 wherein:
the charging request comprises a Diameter charging request; and
at least one new Attribute Value Pair (AVP) is defined for the Diameter charging request specifically for the resource sharing information.

14. The system of claim 13 wherein the at least one AVP includes:
an AVP defined for a sharing indicator specifying that the radio resources are subject to sharing between the MTC traffic and the legacy traffic.

15. The system of claim 13 wherein the at least one AVP includes:
an AVP defined for a method type employed in sharing the radio resources, wherein the method type is selected from static, semi-static, dynamic, or semi-dynamic.

16. The system of claim 13 wherein the at least one AVP includes:
an AVP defined for a time period indicator of when the sharing of the radio resources was in effect.

17. The system of claim 13 wherein the at least one AVP includes:
an AVP defined for an apportionment of the radio resources used for the MTC traffic and the legacy traffic on the air interface.

18. The system of claim 12 further comprising:
the charging system which comprises an Offline Charging System (OFCS);
wherein the OFCS is configured to receive the charging request, to process the resource sharing information included in the charging request, and to generate a partial Charging Data Record (CDR) that includes a charging field for the resource sharing information.

19. The system of claim 12 further comprising:
the charging system which comprises an Online Charging System (OCS);
wherein the OCS is configured to receive the charging request, to process the resource sharing information included in the charging request, and to grant a credit slice for the mobile device with a charging rate discounted based on the resource sharing information.

20. A method of charging, the method comprising:
receiving, in a network element of a core network, resource sharing information regarding sharing of radio resources on at least one radio channel of a bandwidth between Machine Type Communication (MTC) traffic and legacy traffic over an air interface, wherein the network element provides services to mobile devices that attach to a wireless access network;
collecting charging information, at a Charging Trigger Function (CTF) of the network element, for a mobile device regarding either the MTC traffic or the legacy traffic;
formatting, at the CTF, the charging information into a charging request;
formatting, at the CTF, the resource sharing information regarding the sharing of the radio resources on the at least one radio channel between the MTC traffic and the legacy traffic into the charging request; and
transmitting the charging request from the CTF to a charging system.

21. The method of claim 20 wherein:
the charging request comprises a Diameter charging request; and
at least one new Attribute Value Pair (AVP) is defined for the Diameter charging request specifically for the resource sharing information.

22. The method of claim 21 wherein the at least one AVP includes:
an AVP defined for a sharing indicator specifying that the radio resources are subject to sharing between the MTC traffic and the legacy traffic.

23. The method of claim 21 wherein the at least one AVP includes:
an AVP defined for a method type employed in sharing the radio resources, wherein the method type is selected from static, semi-static, dynamic, or semi-dynamic.

24. The method of claim 21 wherein the at least one AVP includes:
   an AVP defined for a time period indicator of when the sharing of the radio resources was in effect.

25. The method of claim 21 wherein the at least one AVP includes:
   an AVP defined for an apportionment of the radio resources used for the MTC traffic and the legacy traffic on the air interface.

26. The method of claim 20 further comprising:
   receiving the charging request in the charging system, wherein the charging system comprises an Offline Charging System (OFCS);
   processing the resource sharing information included in the charging request; and
   generating a partial Charging Data Record (CDR) that includes a charging field for the resource sharing information.

27. The method of claim 20 further comprising:
   receiving the charging request in the charging system, wherein the charging system comprises an Online Charging System (OCS);
   processing the resource sharing information included in the charging request; and
   granting a credit slice for the mobile device with a charging rate discounted based on the resource sharing information.

* * * * *